(12) United States Patent
Kim et al.

(10) Patent No.: US 10,443,279 B2
(45) Date of Patent: Oct. 15, 2019

(54) SINGLE LINK HOOK LATCH

(71) Applicant: HARTWELL CORPORATION, Placentia, CA (US)

(72) Inventors: Simon J. Kim, Placentia, CA (US); Bo D. Artin, Placentia, CA (US)

(73) Assignee: HARTWELL CORPORATION, Placentia, CA (US)

( * ) Notice: Subject to any disclaimer, the term of this patent is extended or adjusted under 35 U.S.C. 154(b) by 479 days.

(21) Appl. No.: 15/255,000

(22) Filed: Sep. 1, 2016

(65) Prior Publication Data

US 2017/0058583 A1 Mar. 2, 2017

Related U.S. Application Data

(60) Provisional application No. 62/212,858, filed on Sep. 1, 2015.

(51) Int. Cl.
| | |
|---|---|
| *E05C 19/12* | (2006.01) |
| *E05C 3/16* | (2006.01) |
| *E05B 13/00* | (2006.01) |
| *E05B 63/06* | (2006.01) |
| *B64D 29/06* | (2006.01) |
| *E05C 19/14* | (2006.01) |

(52) U.S. Cl.
CPC ............ *E05C 19/12* (2013.01); *B64D 29/06* (2013.01); *E05B 13/002* (2013.01); *E05B 63/06* (2013.01); *E05C 3/16* (2013.01); *E05C 19/14* (2013.01); *E05Y 2900/502* (2013.01)

(58) Field of Classification Search
CPC ..... B64D 29/06; B64D 11/003; E05C 19/145; E05C 19/14; E05C 1/065; E05C 19/10; E05C 3/122; Y10S 292/31; Y10S 292/49
See application file for complete search history.

(56) References Cited

U.S. PATENT DOCUMENTS

| | | | |
|---|---|---|---|
| 2,904,141 A | 9/1959 | Henrichs | |
| 4,116,479 A | 9/1978 | Poe | |
| 4,183,564 A * | 1/1980 | Poe | E05B 15/025 292/113 |
| 4,318,557 A | 3/1982 | Bourne et al. | |
| 4,602,812 A | 7/1986 | Bourne | |
| 4,618,557 A | 10/1986 | Dan et al. | |
| 5,620,212 A * | 4/1997 | Bourne | B64D 29/06 292/113 |
| 5,984,382 A * | 11/1999 | Bourne | B64D 29/06 292/113 |

(Continued)

FOREIGN PATENT DOCUMENTS

| | | |
|---|---|---|
| EP | 0839714 | 5/1998 |
| EP | 1091059 | 4/2001 |

(Continued)

OTHER PUBLICATIONS

Search Report and Written Opinion issued in App. No. PCT/US2016/050002 (dated 2016).

*Primary Examiner* — Mark A Williams
(74) *Attorney, Agent, or Firm* — Barnes & Thornburg LLP

(57) ABSTRACT

A latch mechanism includes a hook, a displaceable handle, and links connected between the handle and hook for the operation of the latch mechanism. The handle and links cooperate with the hook to hold the latch mechanism in a locked position.

20 Claims, 6 Drawing Sheets

(56) References Cited

U.S. PATENT DOCUMENTS

| | | | | |
|---|---|---|---|---|
| 6,279,971 B1* | 8/2001 | Dessenberger, Jr. | ... | E05B 41/00 244/129.4 |
| 6,343,815 B1* | 2/2002 | Poe | ...... | E05C 19/145 292/113 |
| 7,066,501 B2* | 6/2006 | Meineke | ........ | B64D 29/06 244/129.4 |
| 8,573,934 B2* | 11/2013 | Soulier | ........ | B64D 29/06 244/129.4 |
| 8,864,185 B2 | 10/2014 | Do | | |
| 8,864,189 B2 | 10/2014 | Fournie et al. | | |
| 8,925,979 B2* | 1/2015 | Hernandez | ...... | E05B 63/143 292/113 |
| 9,580,945 B2 | 2/2017 | Artin | | |
| 9,677,306 B2* | 6/2017 | DeFrance | ........ | E05C 19/10 |
| 2008/0129056 A1* | 6/2008 | Hernandez | ...... | E05B 63/143 292/98 |
| 2011/0133489 A1 | 6/2011 | Hemeury et al. | | |
| 2011/0174929 A1 | 7/2011 | Rowbut et al. | | |
| 2011/0227350 A1* | 9/2011 | Do | ...... | B64C 1/1446 292/105 |
| 2013/0328326 A1* | 12/2013 | DeFrance | ...... | E05C 19/10 292/114 |
| 2015/0259957 A1* | 9/2015 | Hernandez | ...... | E05C 19/145 292/97 |
| 2016/0069118 A1 | 3/2016 | Artin | | |
| 2017/0058583 A1 | 3/2017 | Kim et al. | | |
| 2017/0260782 A1 | 9/2017 | Kim et al. | | |

FOREIGN PATENT DOCUMENTS

| | | |
|---|---|---|
| EP | 1927711 | 6/2008 |
| EP | 2547848 | 8/2015 |

\* cited by examiner

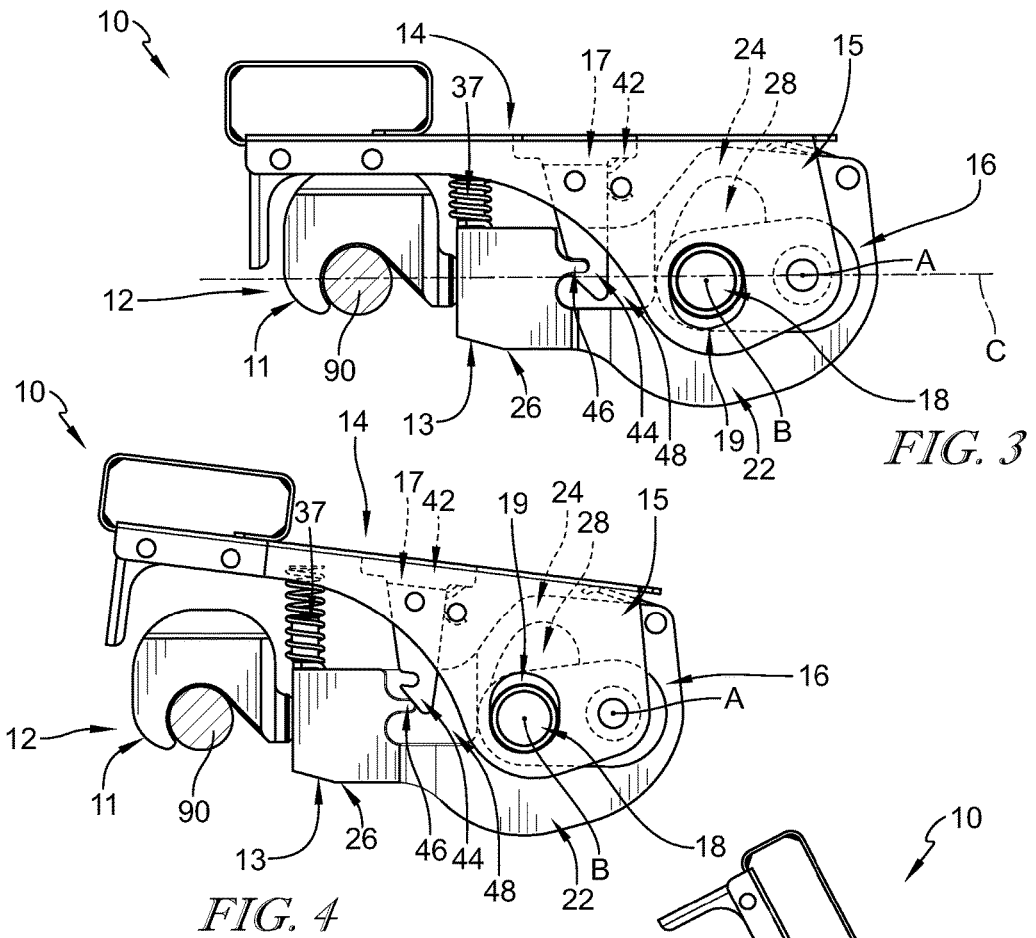
FIG. 3
FIG. 4
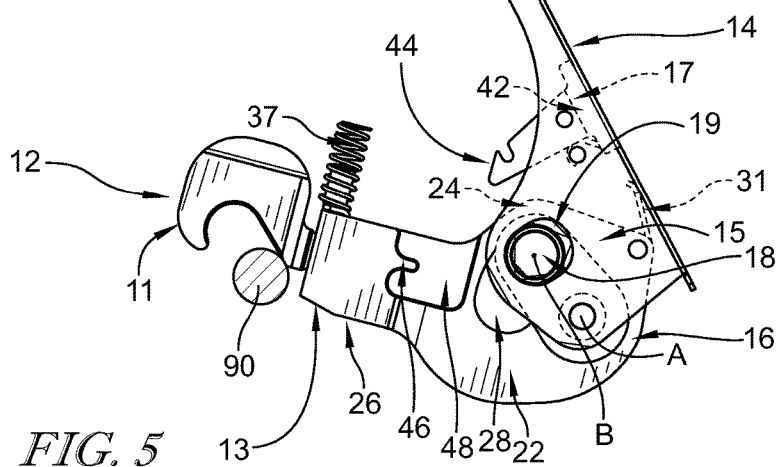
FIG. 5

SINGLE LINK HOOK LATCH

PRIORITY CLAIM

This application claims priority under 35 U.S.C. § 119(e) to U.S. Provisional Application Ser. No. 62/212,858, filed Sep. 1, 2015, which is expressly incorporated by reference herein.

FIELD OF THE DISCLOSURE

The present disclosure relates generally to a latch, and more specifically to a single link latch mechanism for use on aircraft.

BACKGROUND

In some latch mechanism development programs, the space, volume, or "envelope" in which the latch is to be installed is limited and defined by the overall aircraft system. Such aircraft systems also strive to reduce the weight of latch mechanisms while maintaining the high reliability and integrity of the latch mechanism to continuously and predictably operate in challenging environments. When the envelope available for a latch mechanism is dramatically reduced, the latch mechanism must be redesigned to meet the design requirements. It is also useful to develop new ways of producing structures used in the latch mechanism to reduce material, manufacturing operations, cost, and other characteristics while maintaining the high reliability, function, and strength of the components.

This background information is provided to provide some information believed by the applicant to be of possible relevance to the present disclosure. No admission is intended, nor is such an admission to be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

SUMMARY

A latch mechanism of the present disclosure solves various design problems associated with a single link latch used in a restricted space as well as other applications. The following disclosure relates to a latch mechanism for use in latching a first body to a second body. Such a latch mechanism could be used in an aircraft to latch a first panel or structure to a second panel or structure. The latch mechanism includes a hook, a displaceable handle, and links connected between the handle and hook for the operation of the latch mechanism.

BRIEF DESCRIPTION OF THE DRAWINGS

The present disclosure will be described hereafter with reference to the attached drawings which are given as a non-limiting example only, in which:

FIG. 3 is a side elevational view of the latch mechanism of FIG. 1 showing the hook engaged with a keeper and suggesting that the latch mechanism blocks movement of the keeper when the latch mechanism is in a locked position;

FIG. 4 is a view similar to FIG. 3 showing the handle moved from the closed position toward the opened position after a trigger of the handle is disengaged from the hook;

FIG. 5 is a view similar to FIG. 4 showing the handle moved to the opened position to disengage the hook from the keeper;

Figure 1:
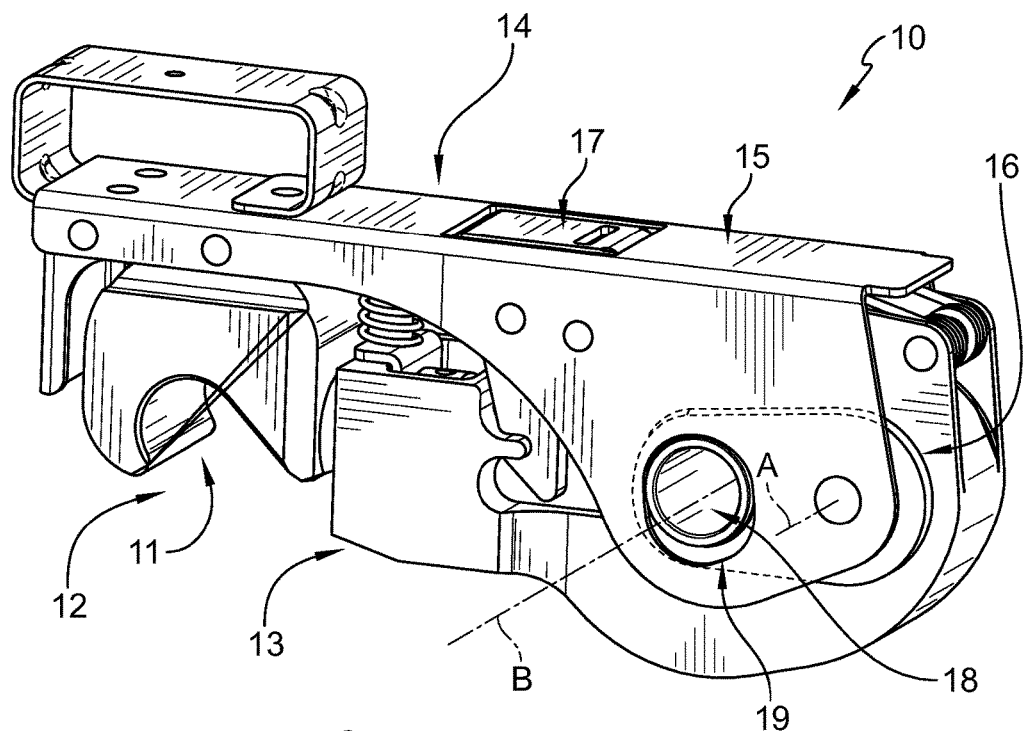
FIG. 1 is a perspective view of one embodiment of a latch mechanism in accordance with the present disclosure showing that the latch mechanism includes a hook, a displaceable handle, and links connected between the handle and hook and suggesting that the handle and links cooperate with the hook to hold the latch mechanism in a locked position.

The exemplification set out herein illustrates embodiments of the disclosure that are not to be construed as limiting the scope of the disclosure in any manner Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. In addition, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Figure 2:
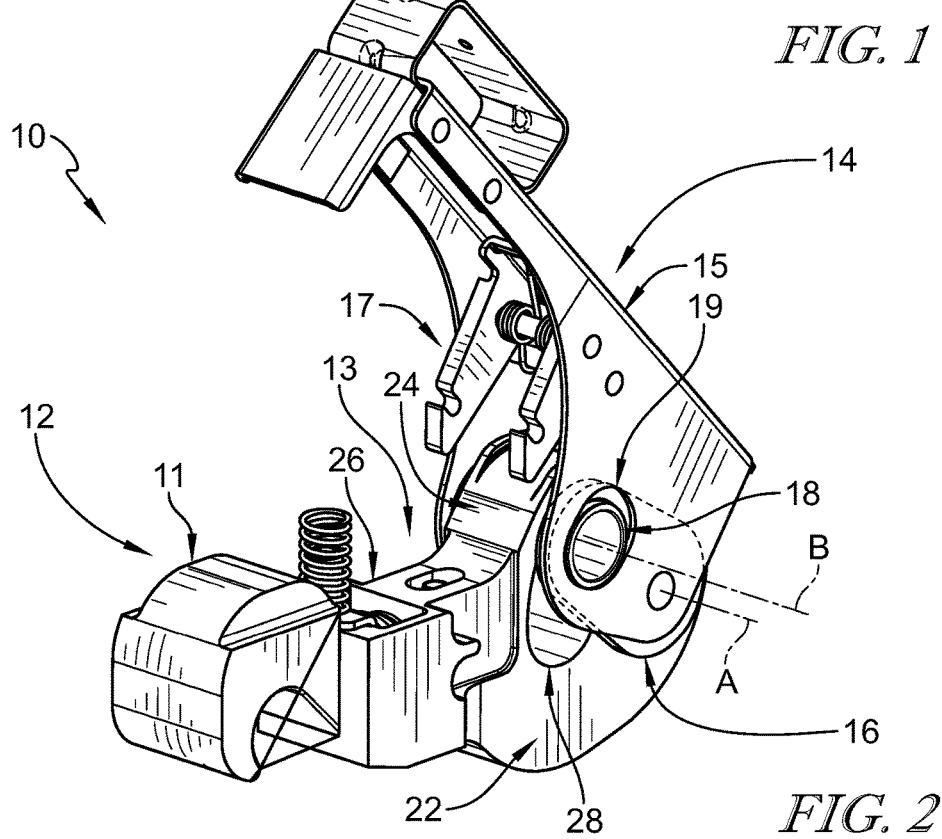
FIG. 2 is a view similar to FIG. 1 showing the latch mechanism in an unlocked position and suggesting that the handle moved from a closed position, as shown in FIG. 1, to an opened position as shown in FIG. 2.

An illustrative latch mechanism 10 in accordance with the present disclosure is shown in FIGS. 1 and 2. Latch mechanism 10 includes a hook 12, a handle 14, and a connecting linkage 16 coupled to hook 12 and handle 14. A mounting bushing 18 extends through latch mechanism 10 and is configured to receive a mounting bolt or other fastener to hold latch mechanism 10 to a component, such as a panel of an aircraft.

Hook 12 includes an adjustable hook end 11 and a hook body 13 as shown in FIGS. 1 and 2. Hook body 13 includes a primary arm 22, a bridge 24 coupled to arm 22, and a hook-end receiver 26 coupled to arm 22 and bridge 24 as shown in FIG. 2. Hook body 13 is also formed to define a generally vertically-extending, arcuate slot 28 extending between arm 22 and bridge 24. Bridge 24 cooperates with arm 22 to maximize the strength and durability of hook 12.

Handle 14 and linkage 16 are rotatable about an axis A through latch mechanism 10 as suggested in FIGS. 1 and 2. Latch mechanism 10, including hook 12, is rotatable about an axis B extending through bushing 18. Handle 14 and linkage 16 control movement of hook 12 relative to a keeper 90 mounted on an adjacent component to the one latch mechanism 10 is mounted to as suggested in FIGS. 3-5. Latch mechanism 10 is configured to block movement of keeper 90 to hold adjacent components, such as panels of an aircraft, together at the selection of a user.

Latch mechanism 10 is shown in a locked position in FIG. 3. Handle 14 includes a frame 15 and a trigger 17 coupled to frame 15. An oblong opening 19 is formed through frame 15 which engages with bushing 18 to hold bushing against arm 22 in slot 28 when handle 14 is in a closed position as shown in FIG. 3. Linkage 16 cooperates with hook 12 to provide an over-center arrangement where axis B through bushing 18 is offset from a centerline C (extending through axis A and keeper 90) toward arm 22.

Trigger 17 includes a button pad 42 and a catch 44 as shown in FIG. 3. Hook body 13 is formed to define a recess 48 and a retainer 46. Catch 44 engages with retainer 46 to hold handle 14 in the closed position at the selection of a user. A user engages pad 42 to rotate trigger 17 relative to frame 15 such that catch 44 moves within recess 48 to disengage catch 44 from retainer 46.

A pop-up spring 37 engages with handle 14 to rotate handle 14 about axis A when catch 44 is released from retainer 46 as suggested in FIG. 4. Opening 19 is configured to allow handle 14 to rotate from the closed position, shown in FIG. 3, to a pop-up position, shown in FIG. 4, without moving bushing 18 within slot 28. A user rotates handle 14 about axis A toward an opened position to move latch mechanism 10 to an unlocked position where hook end 11 is disengaged from keeper 90 to allow movement of keeper 90 as suggested in FIG. 5. As handle 14 rotates, bushing 18 moves in slot 28 and linkage 16 moves hook 12 relative to keeper 90. In the illustrative embodiment, a spring 31 biases handle 14 toward the opened position to assist a user in unlocking latch mechanism 10.

Figure 6:
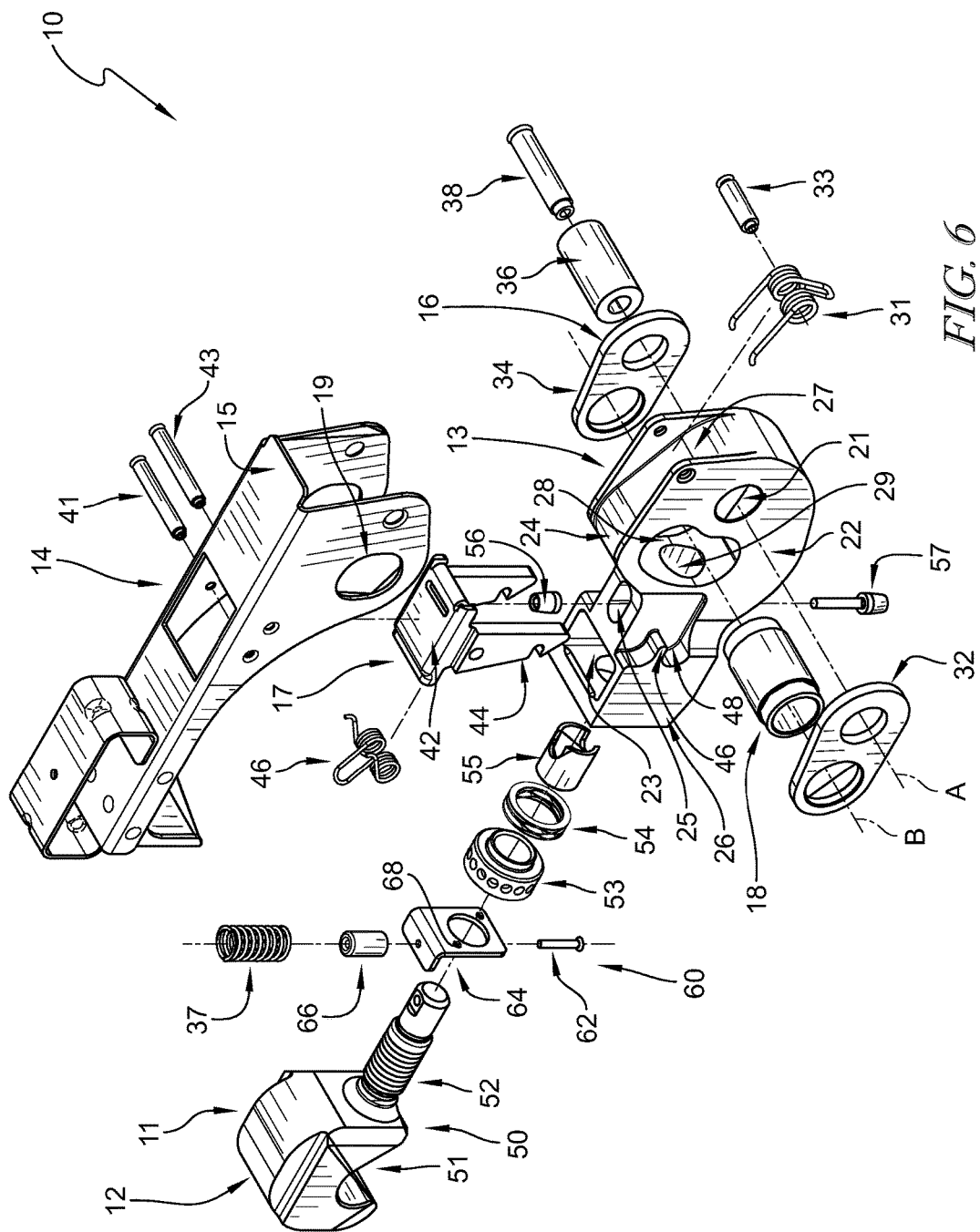
FIG. 6 is an exploded perspective view of the latch mechanism of FIG. 1.

An exploded assembly view of latch mechanism 10 is shown in FIG. 6. Linkage 16 includes a first link 32 positioned to one side of hook body 13 and a second link 34 positioned on an opposing side of hook body 13. Bushing 18 extends into slot 28 and links 32, 34 engage with bushing 18 along axis B. Each link 32, 34 is a single in-line link extending between rotation axis A and bushing 18.

A sleeve 36 extends through a hole 21 formed through hook body 13 and engages with links 32, 34 along axis A to mound links 32, 34 for rotation about axis A as suggested in FIG. 6. A fastener 38, such as a rivet, extends through frame 15 and through sleeve 36 to mount handle 14 on hook 12 for rotation about axis A. Opposing ends of bushing 18 extend into opening 19 of frame 15 when handle 14 is mounted on hook 12. Spring 31 extends into a channel 27 of hook body 13 and a fastener 33, such as a rivet, couples spring 31 to hook body 13. Spring 31 engages with hook 12 and handle 14 to bias handle 14 toward the opened position.

Trigger 17 is coupled to frame 15 by a fastener 41, such as a rivet, as suggested in FIG. 6. A spring 46 is mounted on fastener 41 and engages with pad 42 and a fastener 43, such as a rivet, to bias catch 44 toward retainer 46. Fastener 43 is also configured to limit rotation of trigger 17 relative to frame 15.

Adjustable hook end 11 includes a head 50 and an adjuster 53 as shown in FIG. 6. Head 50 includes a grip 51 and a shaft 52 extending from grip 51. In the illustrative embodiment, shaft 52 is threaded and adjuster 53 engages with shaft 52 to move head relative to hook body 13 when adjuster 53 is rotated. Adjuster 53 is received in a pocket 23 and shaft 52 extends into a bore 29 formed in hook body 13 to engage with adjuster 53. In some embodiments, hook end 11 is fixed relative to hook body 13 and not adjustable. In some embodiments, the position of keeper 90 is adjustable.

A pin 57 extends into a passage 25 of hook body 13 to engage with shaft 52 of head 50 as suggested in FIG. 6. A cap 56 engages with pin 57 to secure pin 57 to shaft 52. A cup 55 extends over an end of shaft 52 and engages with pin 57 and cap 56. Pin 57 and cap 56 move in passage 25 as head 50 is adjusted and are configured to limit travel of head 50 relative to hook body 13. Pin 57 and cap 56 engage with shaft 52 and hook-end receiver 26 to block rotation of head 50.

A spring assembly 60 and a spring washer 54 extend into pocket 23 with adjuster 53 as suggested in FIG. 6. Spring assembly 60 includes a mounting plate 64 and a post 66 coupled to mounting plate 64 by a pin 62. The pop-up spring 37 extends over post 66 to couple pop-up spring 37 with hook 12. In the illustrative embodiment, spring washer 54 engages with hook body 13 to bias adjuster 53 toward contacts 68 of mounting plate 64. Contacts 68 control rotation of adjuster 53.

Figure 7:
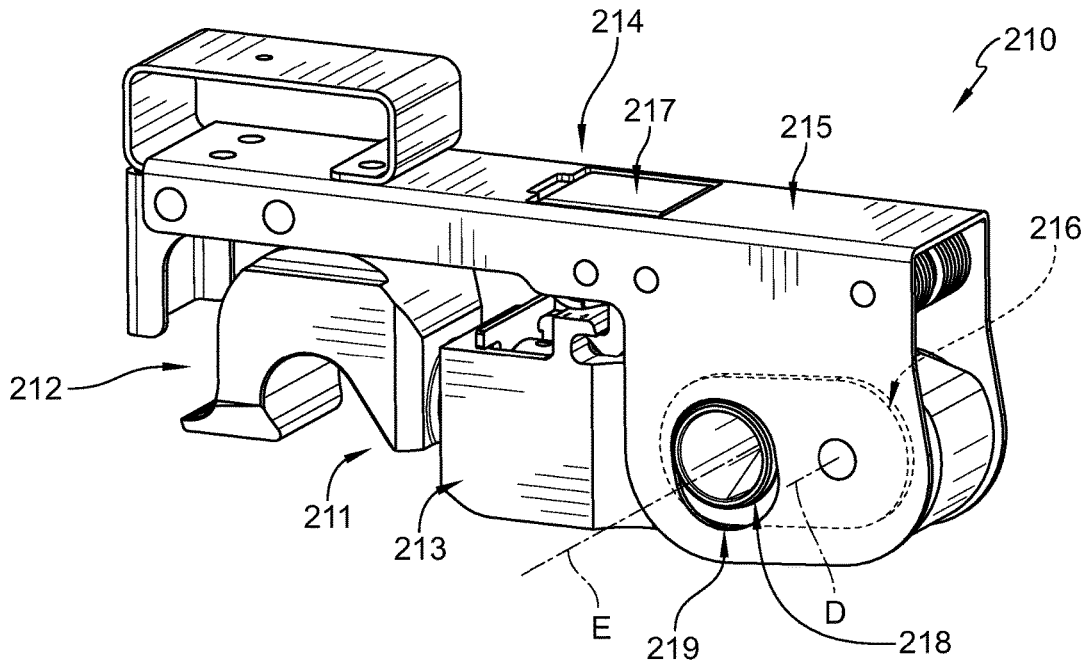
FIG. 7 is a perspective view of another embodiment of a latch mechanism in accordance with the present disclosure showing that the latch mechanism includes a hook, a displaceable handle, and links connected between the handle and hook and suggesting that the handle and links cooperate with the hook to hold the latch mechanism in a locked position.
Figure 8:
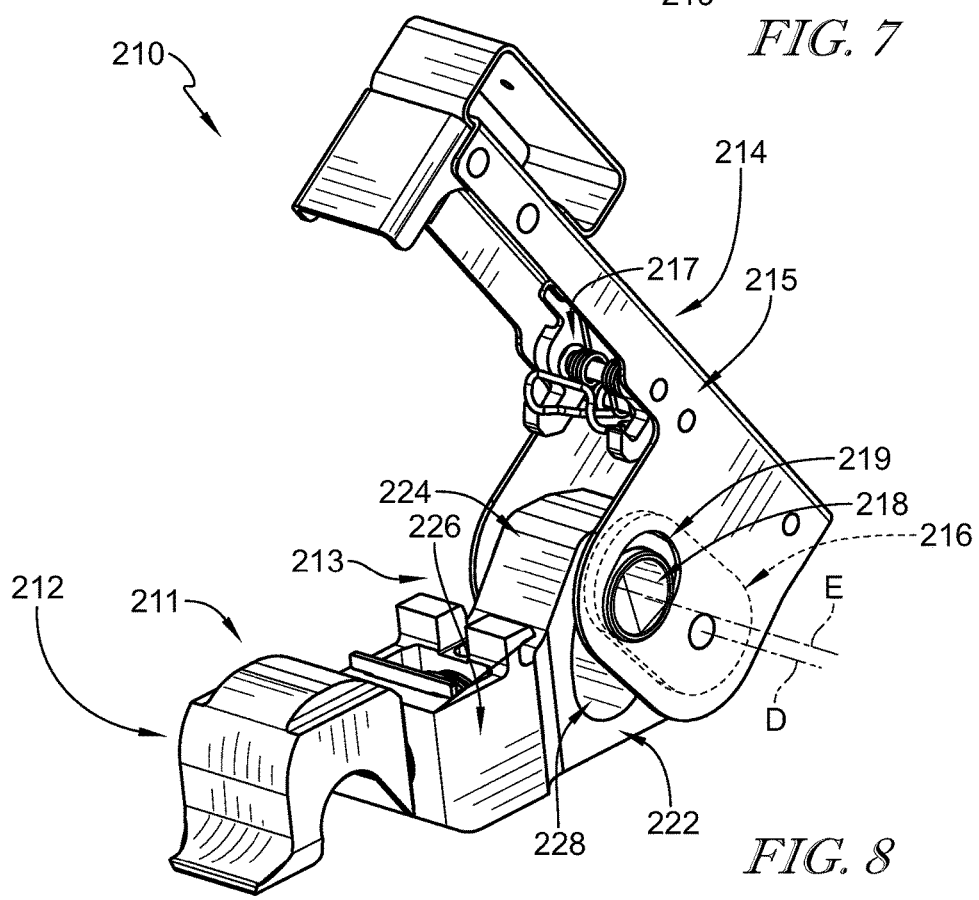
FIG. 8 is a view similar to FIG. 7 showing the latch mechanism in an unlocked position and suggesting that the handle moved from a closed position, as shown in FIG. 7, to an opened position as shown in FIG. 8.

Another embodiment of an illustrative latch mechanism 210 in accordance with the present disclosure is shown in FIGS. 7 and 8. Latch mechanism 210 includes a hook 212, a handle 214, and a connecting linkage 216 coupled to hook 212 and handle 214. A mounting bushing 218 extends through latch mechanism 210 and is configured to receive a mounting bolt or other fastener to hold latch mechanism 210 to a component, such as a panel of an aircraft.

Hook 212 includes an adjustable hook end 211 and a hook body 213 as shown in FIGS. 7 and 8. Hook body 213 includes a primary arm 222, a bridge 224 coupled to arm 222, and a hook-end receiver 226 coupled to arm 222 and bridge 224 as shown in FIG. 8. Hook body 213 is also formed to define an arcuate slot 228 extending between arm 222 and bridge 224. Bridge 224 cooperates with arm 222 to maximize the strength and durability of hook 212.

Handle 214 and linkage 216 are rotatable about an axis D through latch mechanism 210 as suggested in FIGS. 7 and 8. Latch mechanism 210, including hook 212, is rotatable about an axis E extending through bushing 218. Handle 214 and linkage 216 control movement of hook 212 relative to a keeper 290 mounted on an adjacent component to the one latch mechanism 210 is mounted to as suggested in FIGS. 9-11. Latch mechanism 210 is configured to block movement of keeper 290 to hold adjacent components, such as panels of an aircraft, together at the selection of a user.

Figure 9:
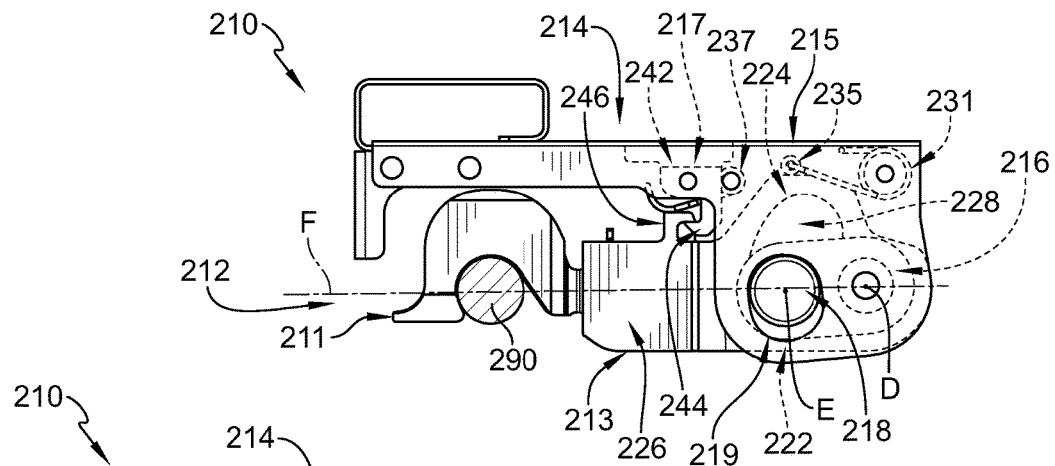
FIG. 9 is a side elevational view of the latch mechanism of FIG. 7 showing the hook engaged with a keeper and suggesting that the latch mechanism blocks movement of the keeper when the latch mechanism is in a locked position.

Latch mechanism 210 is shown in a locked position in FIG. 9. Handle 214 includes a frame 215 and a trigger 217 coupled to frame 215. An oblong opening 219 is formed through frame 215 which engages with bushing 218 to hold bushing against arm 222 in slot 228 when handle 214 is in a closed position as shown in FIG. 9. Linkage 216 cooperates with hook 212 to provide an over-center arrangement where axis E through bushing 18 is offset from a centerline F (extending through axis D and keeper 290) toward arm 222.

Trigger 217 includes a button pad 242 and a catch 244 as shown in FIG. 9. A retainer 246 is coupled to hook-end receiver 226, and catch 244 engages with retainer 246 to hold handle 214 in the closed position at the selection of a user. A user engages pad 242 to rotate trigger 217 relative to frame 215 to disengage catch 244 from retainer 246.

Figure 10:
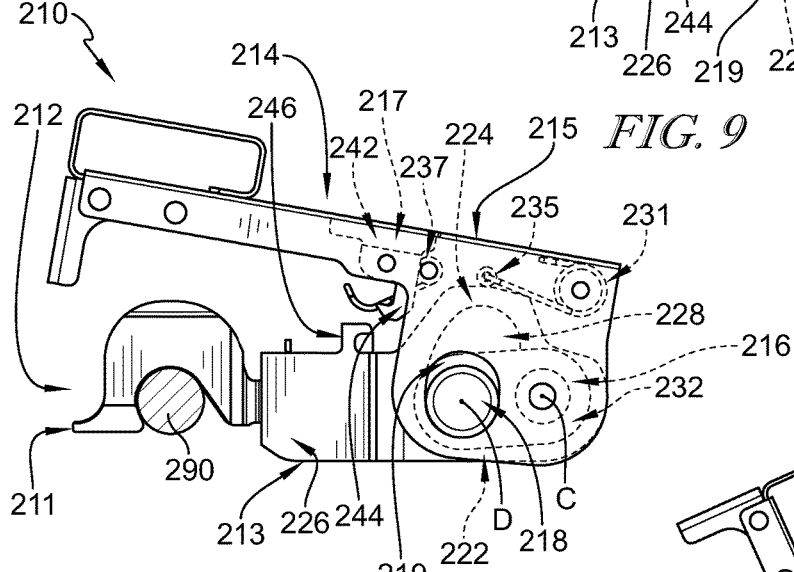
FIG. 10 is a view similar to FIG. 9 showing the handle moved from the closed position toward the opened position after a trigger of the handle is disengaged from the hook.

A pop-up spring 237 engages with handle 214 and retainer 246 to rotate handle 214 about axis D when catch 244 is released from retainer 246 as suggested in FIG. 10. Opening 219 is configured to allow handle 214 to rotate from the closed position, shown in FIG. 9, to a pop-up position, shown in FIG. 10, without moving bushing 218 within slot 228. A user rotates handle 214 about axis D toward an opened position to move latch mechanism 210 to an unlocked position where hook end 211 is disengaged from keeper 290 to allow movement of keeper 290 as suggested in FIG. 11. As handle 214 rotates, bushing 218 moves in slot 228 and linkage 216 moves hook 212 relative to keeper 290.

Figure 11:
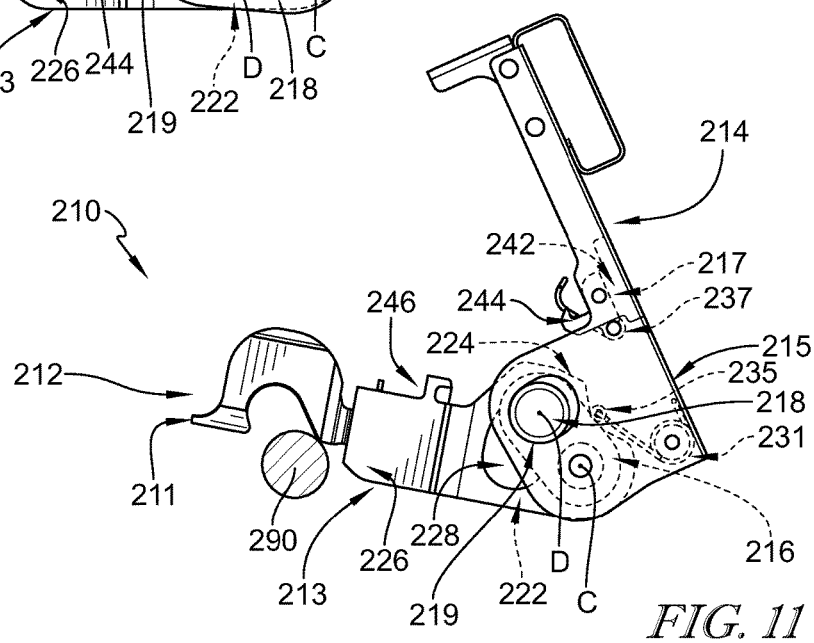
FIG. 11 is a view similar to FIG. 10 showing the handle moved to the opened position to disengage the hook from the keeper.

In the illustrative embodiment, a spring 231 biases handle 214 toward the opened position to assist a user in unlocking latch mechanism 210 as suggested in FIGS. 9-11. A roller 235 coupled to spring 231 travels along bridge 224 as handle 214 moves toward the opened position. Roller 235 allows spring 231 to provide biasing force against handle 214 and hook 212 for substantially the full travel of handle 214 from the closed position to the opened position.

Figure 12:
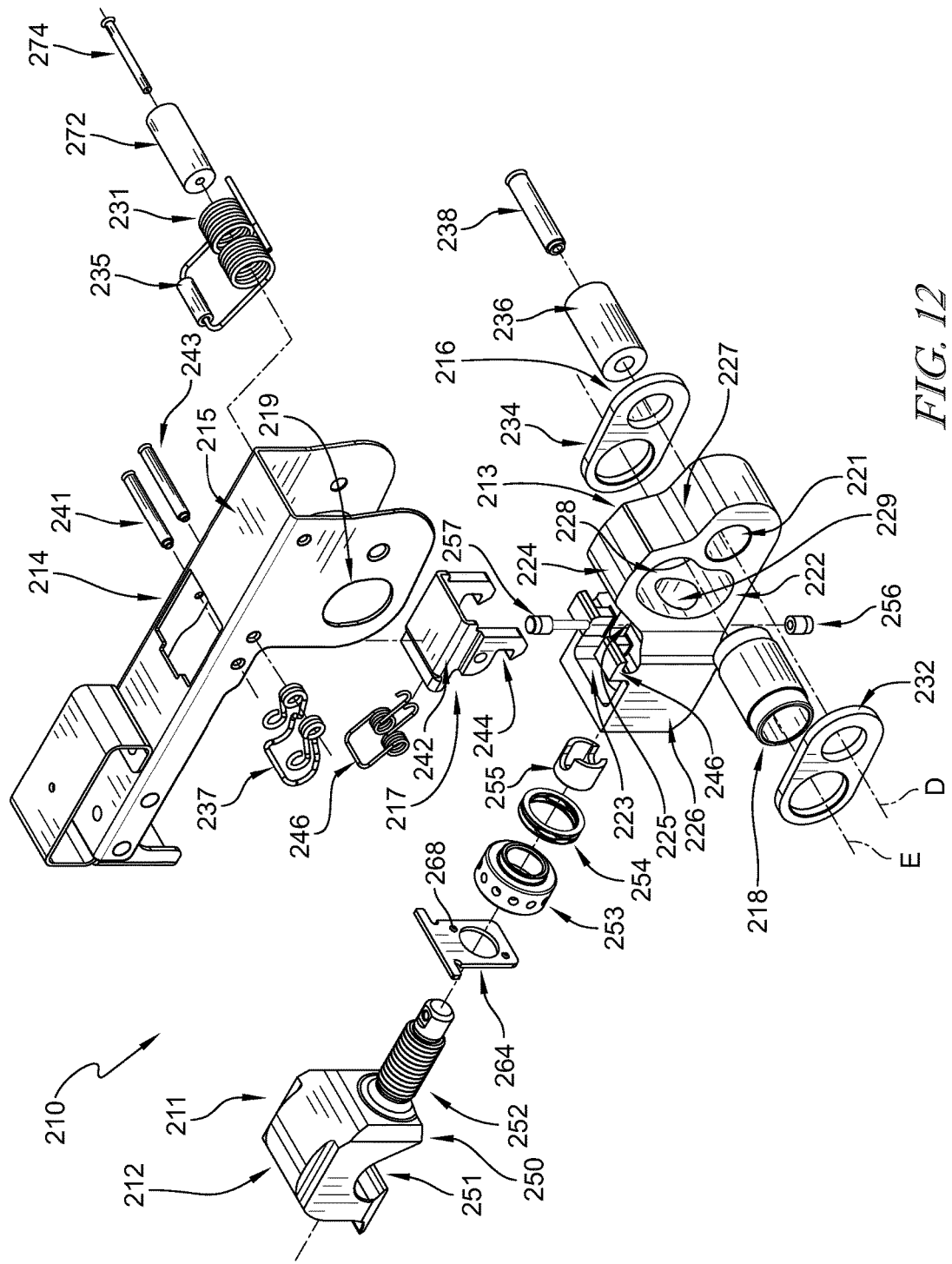
FIG. 12 is an exploded perspective view of the latch mechanism of FIG. 7.

An exploded assembly view of latch mechanism 210 is shown in FIG. 12. Linkage 216 includes a first link 232 positioned to one side of hook body 213 and a second link 234 positioned on an opposing side of hook body 213. Bushing 218 extends into slot 228 and links 232, 234 engage with bushing 218 along axis E. Each link 232, 234 is a single in-line link extending between rotation axis D and bushing 218.

A sleeve 236 extends through a hole 221 formed through hook body 213 and engages with links 232, 234 along axis D to mound links 232, 234 for rotation about axis D as suggested in FIG. 12. A fastener 238, such as a rivet, extends through frame 215 and through sleeve 236 to mount handle 214 on hook 212 for rotation about axis D. Opposing ends of bushing 218 extend into opening 219 of frame 215 when handle 214 is mounted on hook 212.

Spring 231 is mounted on a base 272 and coupled to frame 215 by a fastener 274, such as a rivet, as suggested in FIG. 12. Spring 231 engages with handle 214, and roller 235 engages with bridge 224, to bias handle 214 toward the opened position. Roller 235 rides on bridge 224 toward an indent 227 of hook body 213 as handle 214 moves toward the opened position.

Trigger 217 is coupled to frame 215 by a fastener 241, such as a rivet, as suggested in FIG. 12. A spring 246 is mounted on fastener 241 and engages with pad 242 and a fastener 243, such as a rivet, to bias catch 244 toward retainer 246. Fastener 243 is also configured to limit rotation of trigger 217 relative to frame 215. Pop-up spring 237 is mounted on fastener 243.

Adjustable hook end 211 includes a head 250 and an adjuster 253 as shown in FIG. 12. Head 250 includes a grip 251 and a shaft 252 extending from grip 251. In the illustrative embodiment, shaft 252 is threaded and adjuster 253 engages with shaft 252 to move head relative to hook body 213 when adjuster 253 is rotated. Adjuster 253 is received in a pocket 223 and shaft 252 extends into a bore 229 formed in hook body 213 to engage with adjuster 253.

A pin 257 extends into a passage 225 of hook body 213 to engage with shaft 252 of head 250 as suggested in FIG. 12. A cap 256 engages with pin 257 to secure pin 257 to shaft 252. A cup 255 extends over an end of shaft 252 and engages with pin 257 and cap 256. Pin 257 and cap 256 move in passage 225 as head 250 is adjusted and are configured to limit travel of head 250 relative to hook body 213. A friction plate 264 and a spring washer 254 extend into pocket 223 with adjuster 253 as suggested in FIG. 12. In the illustrative embodiment, spring washer 254 engages with hook body 213 to bias adjuster 253 toward contacts 268 of mounting plate 264. Contacts 268 control rotation of adjuster 253.

In illustrative embodiments, a latch mechanism 10 is shown for example in FIGS. 1 and 2. The latch mechanism is shown in FIG. 1 in the closed position and in FIG. 2 in the open position. The latch mechanism includes a hook body 13 with a hook end 11 extending therefrom. The hook end is adjustable as will be described in further detail below. A handle 14 is carried on the hook body 13 along the pivot axis A. A mounting bushing 18 extends through the handle, and a linkage 16 is positioned between a portion of the handle 14 and the hook body 13. The hook end 11 is used to engage a keeper 90 (see FIG. 3). The latch mechanism 10 is carried on a first component of the aircraft, namely a panel or structure. The keeper 90 is carried on a second component of the aircraft such as a panel or structure. By operation of the hook body 13 and hook end 11 the latch can be moved from a closed position (see FIGS. 1 and 3) and operated by use of the handle 14 to disengage a recess of the hook end 11 from the keeper 90. When engaged as shown in FIG. 3 the engagement of the hook end 11 with the keeper 90 retains the two portions in a closed and latched, or locked, position.

In illustrative embodiments, one of the problems that can occur with a latch system is that it needs to be designed for a specific envelope. The envelope can include a limited amount of space available in which to install and operate the latch. The small envelope generally conforms to the latch mechanism 10 along opposing sides thereof. The latch mechanism 10 of the present disclosure is configured to operate and fit within the envelope.

In illustrative embodiments, a trigger 17 can be operated so as to disengage a catch portion 44 from a retainer portion 46 carried on the hook body. The retainer 46 is sized, dimensioned, and located to receive and retain a notch in the catch 44.

In illustrative embodiments, the latch mechanism 10 provides for a linkage 16 having single in-line links 32, 34. This is in comparison to other latch mechanisms which might include two or more in-line links, coupled in series with one another, to provide the link locking function of the over center linkage 16.

In illustrative embodiments, an upper bridge portion 24 is provided extending over an upper portion of the hook body 13 to carry some of the load of the hook body structure 13 in combination with a primary arm 22. The combination of the upper bridge 24 and primary arm 22 provides significant increase in cross sectional area to distribute and carry the load of the hook body 13.

In illustrative embodiments, the hook body 13 provides the foundation of the assembly of the entire latch 10. The adjustable hook end 11 includes a threaded shank 52 which aligns along the shank access 29 to assemble with the plate 64, adjustable nut 53, wave spring 54, and sleeve 55. This assembly 11 telescopes along the hook access 29 which is an aperture in the hook body 13. The upper bridge 24 extends above this aperture 29 with the primary arm 22 extending below.

In illustrative embodiments, a pair of links 32, 34 are attached on the corresponding sides of the hook body 13. A bushing assembly includes a primary bushing 18 extending through the elongated aperture 28 positioned between the upper bridge 24 and the primary arm 22. The elongated aperture is partially curved to provide a partially arcuate path through which the bushing 18 can move. The bushing engages in the corresponding first holes in the links 32, 34. A pivot bushing assembly includes a bushing 36 and a corresponding pivot rivet 38, which can have a pivot sleeve positioned thereon. This assembly extends through a pivot aperture 21 in the rear of the hook body 13. The assembly extends through the second aperture in each of the links 32, 34. The assembly engages pivot points in the corresponding side plates of the handle frame 15. Similarly, the bushing 18 engages and extends into the oblong aperture 19 in each of the corresponding side plates of the frame 15.

In illustrative embodiments, the handle 14 generally pivots about the pivot axis A with the links 32, 34 moveably attached or retained at the pivot axis A by the assembly of the bushing 36 and rivet 38. The degree of travel of the handle is limited by the elongated aperture 28 and oblong aperture 19 as well as the size and dimension of the bushing 18 carried therein and traveling therethrough.

In illustrative embodiments, the full range of travel of the links 32, 34 and bushing 18 can be seen for example in FIGS. 3-5. The first aperture of the links includes the cylindrical bushing 18 extending therein. The elongated aperture 28 includes an upper curve and a lower curve. Similarly, the oblong opening 19 of the handle 14 includes an upper portion and a lower portion. In the closed or locked position the bushing is retained between the upper portion and lower portion of the elongated opening 19. This helps to provide a single link over-center engagement in the closed position helping prevent disengagement and retain the locked condition.

In illustrative embodiments, when the trigger 17 is actuated to disengage the catch 44 from the retainer 46 the handle can be actuated into the open position as shown in FIGS. 2 and 5. In the open or disengaged position the bushing is retained between the upper curve of the elongated aperture 28 and the lower portion of the handle opening 19. In these two conditions, the degree of travel is limited by the spaced apart ends of the corresponding portions of the elongated opening 28 and the oblong opening 19.

In illustrative embodiments, as noted above, the hook body 13 includes the upper bridge portion 24 and the primary arm 22. These combined structures join in a single beam structure 26. The beam defines a pocket 23 for retaining the adjustable nut with the threaded shaft 52 threadedly extending therethrough. The nut allows for threaded adjustment of the hook end 11 along the aperture 29. A cap 56 and rivet or shaft 57 extend through a passage 25 in the beam 26 to retain the threaded shaft 52 against rotation by extending through a hole in the shaft 52. The passage 25 is elongated to allow for some degree of travel of the rivet 57 and cap 56 therethrough to provide adjustment of the hook end 11.

In illustrative embodiments, the beam 26 can also be configured with the retainer 46 formed therein. A box 48 can be formed in a side of the beam with the protruding retainer 46 formed therein. Forming such a box 48 in each side of the beam minimizes the amount of material removed from the beam to form the box and provide the retainer 46. However, it also accommodates the catches 44 on each side of the trigger 17.

In illustrative embodiments, the trigger 17 is pivotally retained on the handle by the trigger rivet 41 extending through a hole in the handle frame 15. A corresponding hole is formed in each arm of the trigger. The catch portion 44 including the notch is formed on the distal end of each arm. A torsion spring 46 is carried on a spring rivet 43 extending through a corresponding hole of the handle frame 15. The spring acts against the flat pad 42 of the trigger extending between the proximal sides of the arms. The spring 46 biases the trigger 17 into the locked position for engagement between the notches of the catch 44 and the corresponding retainers 46.

In illustrative embodiments, a similar spring assembly including a handle spring 31 is retained by a handle spring rivet 33 extending through flanges of the hook body 13 in the rear area of the hook body. The handle torsion spring 31 is carried on the rivet 33 to act against a portion of the handle 14. The handle is sprung in a normally open position with the spring 31 retained between a surface 27 of the hook body and a rear portion of the handle.

In illustrative embodiments, the trigger 17 is sized, dimensioned and formed in a way to provide a strong and durable trigger 17 while reducing costs, materials yet maintaining reliability and quality of the trigger component. The trigger 17 starts as a flat piece of plate or sheet material. In the flat pad area 42 there have been improvements to the overall construction of the trigger 17. A portion of material is removed from between the legs when the trigger structure is in the plate orientation. Once a portion has been removed the thinner pad 42 can be formed to provide radii while still connecting the pad 42 to the legs. In other words, while the pad can be relatively thin to accommodate the necessary radii to properly connect and retain the arms as part of the assembly the arms are relatively thick to provide additional structural support. The enhanced structure of the trigger 17 provides enhanced reassurance that the catches 44 will remain engaged with the retainers 46. Additionally, this design helps improve the efficiency, reduce costs while maintaining quality of the trigger 17 assembly. A handle opening spring 37 is carried on a post 66 on the beam 26. This spring is normally uncompressed in the latch open position. In the latch closed position the spring 37 is slightly compressed. The spring provides a spring force to help open the handle when the trigger 17 has been actuated.

In illustrative embodiments, the hook body 13 provides a solution to problems associated with designs of latches for small envelope applications. The hook body includes a primary arm 22 and an upper bridge 24 to carry a larger load than most single link latch mechanisms. This structure allows for a more compact yet reliable strong assembly while using the single link structure. The solution enhances the strength and prevents bending which might otherwise occur in a single link latch including only a single arm. These structures 24, 26 also define the elongated opening 28 for retaining the bushing 18 therein to facilitate operation of the latch.

In illustrative embodiments, as noted, the trigger has an improved design to facilitate the formation of the trigger from a generally planar stock material. A portion of the planar stock material is machined to reduce the thickness in the pad 42. This reduced thickness allows for formation of the trigger in its characteristic upside down—U shape. The thinned area in the pad 42 facilitates formation of relatively small radius bends. These relatively small radius bends allow the arms to extend from the pad as formed from a single piece of material. This allows the arms to extend downwardly generally perpendicular to the pad 42. The larger or wider arms provide more engagement surface between the interior surface of the notch and the exterior surface of the retainer 46. This increased surface area provides more contact between the trigger and the hook body. This design helps solve a problem of vibration. The larger mass and greater surface area engagement helps reduce vibration, and enhance the longevity and wear resistance of these components.

The descriptions regarding the functions and benefits of latch mechanism 10 apply with equal force to latch mechanism 210, and vice versa.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

The invention claimed is:

1. A latch mechanism comprising:
   a handle,
   a linkage,
   a hook including a hook body and a hook end coupled to the hook body, the handle and the linkage coupled to the hook body for rotation about a first rotation axis relative to the hook body, and
   a bushing extending along a second rotation axis, the bushing configured to allow mounting of the latch mechanism on a structure and to allow rotation of the latch mechanism relative to the structure about the second rotation axis, the bushing coupled to the hook body, to the linkage, and to the handle,
   wherein the handle is rotatable about the first rotation axis from a closed position wherein the handle extends along the hook and an opened position where the handle is spaced apart from the hook end, the hook body includes an arm and a bridge coupled to the arm, the bridge and the arm at least partially defining a slot spaced apart from the first rotation axis and extending along an arcuate path around the first rotation axis, the bushing extends into the arcuate slot and is configured to move along the arcuate slot around the first rotation axis with rotation of the handle and the linkage about the first rotation axis, and the handle is configured to engage with the bushing to rotate the linkage and the hook about the second rotation axis.

2. The latch mechanism of claim 1, wherein the handle includes a frame and a trigger coupled to the frame, and wherein the trigger engages with the hook body to hold the handle in the closed position at the selection of a user.

3. The latch mechanism of claim 1, wherein the linkage includes a first link extending along a first side of the hook body and a second link extending along an opposing second side of the hook body.

4. The latch mechanism of claim 3, first link and second link engage with opposing ends of the bushing and are configured to control movement of the bushing relative to the first rotation axis.

5. The latch mechanism of claim 1, further comprising a spring configured to engage with the handle and the hook body to bias the handle toward the opened position.

6. The latch mechanism of claim 5, further comprising a roller coupled to the spring and configured to run along the bridge of the hook body as the handle rotates toward the opened position.

7. The latch mechanism of claim 1, wherein the hook end includes a head and an adjuster coupled to the hook body and configured to engage with the head to control a position of the head relative to the first rotation axis.

8. The latch mechanism of claim 7, wherein the head includes a grip and a shaft extending from the grip, and wherein the adjuster is configured to engage with the shaft to control a position of the head relative to the first rotation axis.

9. The latch mechanism of claim 8, wherein the hook body further includes a hook-end receiver coupled to the bridge and the arm and at least partially defining the slot, and wherein the hook-end receiver is formed to include a pocket configured to receive the adjuster and a bore configured to receive the shaft to allow movement of the head relative to the hook body.

10. The latch mechanism of claim 9, further comprising a pin configured to engage with the shaft, wherein the hook body is formed to include a passage extending across the bore and configured to receive the pin, and wherein the pin is configured to engage with the passage to block rotation of the head and limit travel of the head relative to the first rotation axis.

11. A latch mechanism for retaining a first structure against a second structure, the latch mechanism comprising:
    a handle,
    a linkage,
    a hook including a hook body and a hook end coupled to the hook body, the handle and the linkage coupled to the hook body for rotation about a first rotation axis relative to the hook body, the hook end configured to engage with a keeper of the first structure, and
    a bushing extending along a second rotation axis, the bushing configured to allow mounting of the latch mechanism on the second structure and to allow rotation of the latch mechanism relative to the second structure about the second rotation axis, the bushing coupled to the hook body, to the linkage, and to the handle,
    wherein the handle is rotatable about the first rotation axis from a closed position wherein the handle extends along the hook and an opened position where the handle is spaced apart from the hook end, the hook body includes an arm and a bridge coupled to the arm, the bridge and the arm at least partially defining a slot spaced apart from the first rotation axis and extending along an arcuate path around the first rotation axis, the bushing extends into the arcuate slot and is configured to move along the arcuate slot around the first rotation axis with rotation of the handle and the linkage about the first rotation axis, and the handle is configured to engage with the bushing to rotate the linkage and the hook about the second rotation axis to move the hook relative to the keeper.

12. The latch mechanism of claim 11, wherein the handle includes a frame and a trigger coupled to the frame, and wherein the trigger engages with the hook body to hold the handle in the closed position at the selection of a user.

13. The latch mechanism of claim 11, wherein the linkage includes a first link extending along a first side of the hook body and a second link extending along an opposing second side of the hook body.

14. The latch mechanism of claim 13, first link and second link engage with opposing ends of the bushing and are configured to control movement of the bushing relative to the first rotation axis.

15. The latch mechanism of claim 11, further comprising a spring configured to engage with the handle and the hook body to bias the handle toward the opened position.

16. The latch mechanism of claim 15, further comprising a roller coupled to the spring and configured to run along the bridge of the hook body as the handle rotates toward the opened position.

17. The latch mechanism of claim 11, wherein the hook end includes a head and an adjuster coupled to the hook body and configured to engage with the head to control a position of the head relative to the first rotation axis.

18. The latch mechanism of claim 17, wherein the head includes a grip and a shaft extending from the grip, and wherein the adjuster is configured to engage with the shaft to control a position of the head relative to the first rotation axis.

19. The latch mechanism of claim 18, wherein the hook body further includes a hook-end receiver coupled to the bridge and the arm and at least partially defining the slot, and wherein the hook-end receiver is formed to include a pocket configured to receive the adjuster and a bore configured to receive the shaft to allow movement of the head relative to the hook body.

20. The latch mechanism of claim 19, further comprising a pin configured to engage with the shaft, wherein the hook body is formed to include a passage extending across the bore and configured to receive the pin, and wherein the pin is configured to engage with the passage to block rotation of the head and limit travel of the head relative to the first rotation axis.

* * * * *